United States Patent
Kang et al.

(10) Patent No.: US 6,617,839 B2
(45) Date of Patent: Sep. 9, 2003

(54) METHOD FOR DETECTING CURRENT TRANSFORMER SATURATION

(75) Inventors: Yong-Cheol Kang, Ajung Hyundai Apt. 109-1502, 858-2, Inhu 1-dong, Deokjin-gu, 561-231 Chonju-si, Chonbuk (KR); Sang-Hee Kang, Jugong Apt. 326-205, Banpo 1-dong, Seocho-gu, 137-061 Seoul (KR); Seung-Hun Ok, Chonbuk (KR)

(73) Assignees: Yong-Cheol Kang (KR); Sang-Hee Kang (KR)

( * ) Notice: Subject to any disclaimer, the term of this patent is extended or adjusted under 35 U.S.C. 154(b) by 0 days.

(21) Appl. No.: 10/204,769
(22) PCT Filed: May 17, 2001
(86) PCT No.: PCT/KR01/00809
§ 371 (c)(1),
(2), (4) Date: Aug. 23, 2002
(87) PCT Pub. No.: WO02/093183
PCT Pub. Date: Nov. 2, 2002

(65) Prior Publication Data
US 2003/0057939 A1 Mar. 27, 2003

(51) Int. Cl.[7] ................................. G01R 33/00
(52) U.S. Cl. .................... 324/117 R; 324/141; 324/127
(58) Field of Search ........................ 324/127, 117 R, 324/241, 126, 179, 246, 260, 348, 158.1; 336/171, 175, 181, 184, 96; 343/788; 361/87, 93

(56) References Cited

U.S. PATENT DOCUMENTS

| | | | |
|---|---|---|---|
| 4,746,891 A | * | 5/1988 | Zylstra ................. 336/171 |
| 6,072,310 A | | 6/2000 | Krebs et al. |
| 6,247,003 B1 | * | 6/2001 | Cummins et al. ........... 706/22 |

FOREIGN PATENT DOCUMENTS

| | | |
|---|---|---|
| EP | 0 326 237 | 8/1989 |
| EP | 0 506 035 | 9/1992 |
| JP | 10-221382 | 8/1998 |

OTHER PUBLICATIONS

International Search Report, PCT/KR01/00809, ISA/KR, Feb. 14, 2002.

* cited by examiner

Primary Examiner—Kamand Cuneo
Assistant Examiner—Trung Nguyen
(74) Attorney, Agent, or Firm—Harness, Dickey & Pierce, P.L.C.

(57) ABSTRACT

Disclosed is a method for detecting saturation of a current transformer. The method determines whether or not a change of a secondary current generated in a current transformer is due to the saturation of the current transformer.

6 Claims, 5 Drawing Sheets

METHOD FOR DETECTING CURRENT TRANSFORMER SATURATION

BACKGROUND OF INVENTION

1. Field of the Invention

The present invention relates to a method for detecting saturation in a current transformer, and more particularly, to a method for determining whether or not the change of a secondary current generated in the current transformer is due to saturation of the current transformer.

2. Description of Related Art

A current transformer is a device that measures a current running in a current line and inputs the measured current to a protective relay in a power system. To maximize the flux linkage of the primary and secondary windings, iron-core current transformers are widely used.

The current transformer, as shown in FIG. 1, comprises an iron-core body (34), which concentrates magnetizing flux induced by a primary current running in a line (32), and a secondary coil (36), which coils the iron-core body in order to generate a secondary current from the flux induced in the iron-core body (34).

FIG. 2 shows the equivalent circuit of a normal current transformer, in which L is a magnetizing inductance of the current transformer; $i_m$ is a magnetizing current; $i_2'$ is a secondary current in accordance with the current transformation rate; and $i_2$ is an actual measured secondary current. The magnetizing inductance L is not a constant value and varies depending on the amount of the current. When the flux increases and exceeds a predetermined value, the magnetizing inductance changes significantly. When there is inner change of the current transformer, the current transformer is considered to be saturated.

When the current transformer normally operates, the magnetizing current $i_m$ is low, and the actual measured secondary current value is proportional to the primary current. However, when the current transformer is saturated and the magnetizing inductance value changes significantly, the secondary current value also changes significantly. This can be explained in the equivalent circuit of FIG. 2. As the value L reduces significantly, the magnetizing current $i_m$ increases, resulting in the difference between $i_2$ and $i_2'$ currents. Accordingly, in cases where the current transformer is saturated, the relationship between the finally measured secondary current $i_2$ and the primary current is different from that of normal operation. In addition, the saturation of the current transformer may cause malfunction or time delay of relays.

To detect saturation of the current transformer, which is most responsible for the malfunction of protective relays, the prior art has suggested a method for determining saturation by calculating the flux induced in the iron-core of the current transformer. However, this method is available only when no remanent flux exists in the core at the beginning. Otherwise, this method is difficult to apply, unless the initial value of the remanent flux is given. However, it is difficult to measure or assume the initial value of the remanent flux with the present technology, which is a critical defect of the prior art.

SUMMARY OF THE INVENTION

Unlike the prior art which requires information of the remanent flux to detect current transformer saturation, it is an object of the present invention to provide a method for determining saturation of a current transformer based on a predetermined decision function relating to the differences of secondary current values, regardless of remanent flux.

To achieve the above object, the present invention provides a method for determining saturation of a current transformer, comprising the steps of:

deciding a decision function which utilizes a secondary current value of the current transformer;

deciding a decision function value at each point of time by measuring the secondary current value at predetermined time intervals, and determining whether the decision function value is greater than a predetermined threshold value at each point of time; and when the decision function value is determined to be greater than the predetermined threshold value, determining the beginning or end of the saturation, wherein the saturation of the current transformer is determined to end if the saturation of the current transformer begins before the point that the decision function value is greater than the predetermined threshold value, and the saturation of the current transformer is determined to begin if the saturation of the current transformer ends or does not begin before the point that the decision function value is greater than the predetermined threshold value.

At the step of deciding the decision function, the decision function is preferably one of a second-order difference, an adjusted second-order difference, an energy function of the second-order difference and an energy function of the adjusted second-order difference.

At the step of deciding the decision function, the decision function is preferably one of a third-order difference, an adjusted third-order difference, an energy function of the third-order difference and an energy function of the adjusted third-order difference.

At the step of deciding the decision function, the decision function is preferably one of a fourth order difference, an adjusted fourth order difference, an energy function of the fourth order difference and an energy function of the adjusted fourth order difference.

The step of determining the saturation includes a preventative malfunction step of determining one of the tiem points as an effective detection point and neglecting the other time points, wherein the decision function values are detected as being greater than a predetermined threshold value at a plurality of time points in series.

BRIEF DESCRIPTION OF THE DRAWINGS

FIGS. 5A to 5E are graphs illustrating results of application for detecting the saturation of the current transformer according to one embodiment of the present invention, where the remanent magnetizing flux is +80%, wherein FIG. 5A shows a secondary current of a current transformer, where the remanent magnetizing flux is +80%;

FIG. 5B shows a first-order difference of a secondary current of a current transformer, where the remanent magnetizing flux is +80%;

FIG. 5C shows a second-order difference of a secondary current of a current transformer, where the remanent magnetizing flux is +80%;

FIG. 5D shows a third-order difference of a secondary current of a current transformer, where the remanent magnetizing flux is +80%; and FIG. 5E shows saturation sections detected by using one embodiment of the present invention, where the remanent magnetizing flux is +80%.

DETAILED DESCRIPTION OF THE PREFERRED EMBODIMENT

With reference to the accompanying drawings, preferred embodiments of the present invention will be described below.

Figure 1:
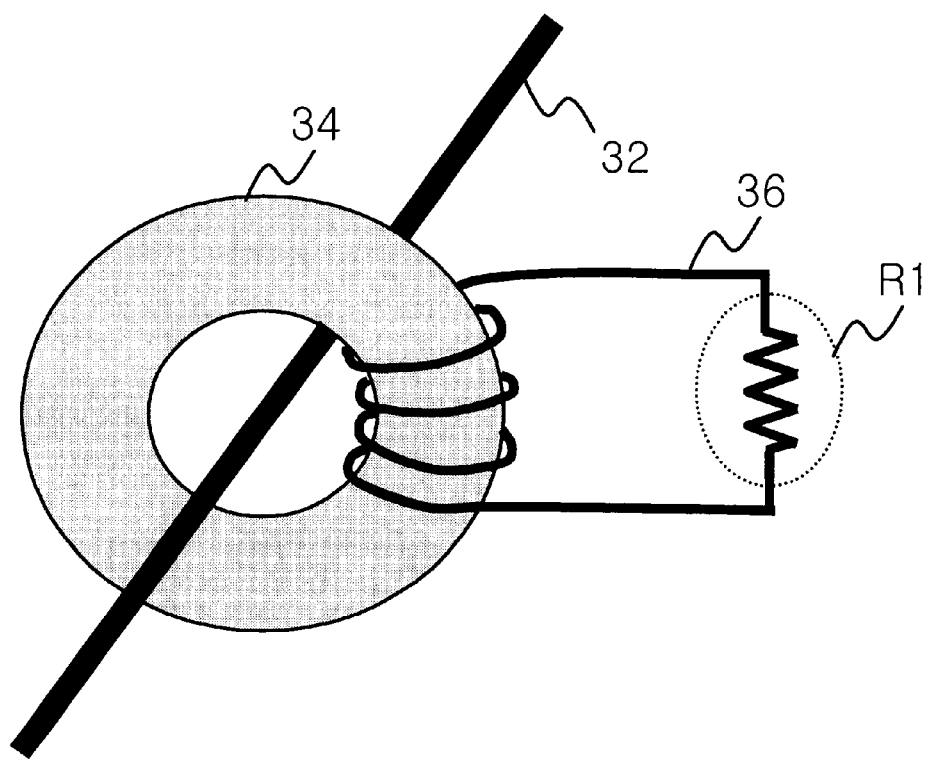
FIG. 1 is a view illustrating a general construction of a current transformer.
Figure 2:
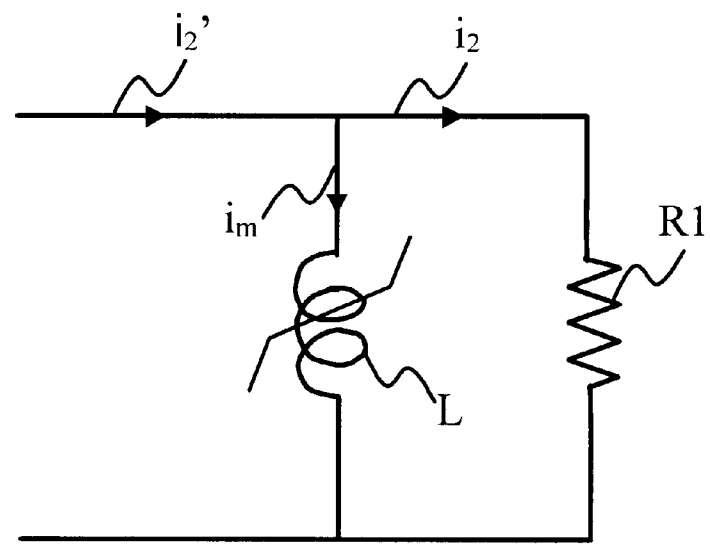
FIG. 2 is an equivalent circuit diagram of a general current transformer.
Figure 3:
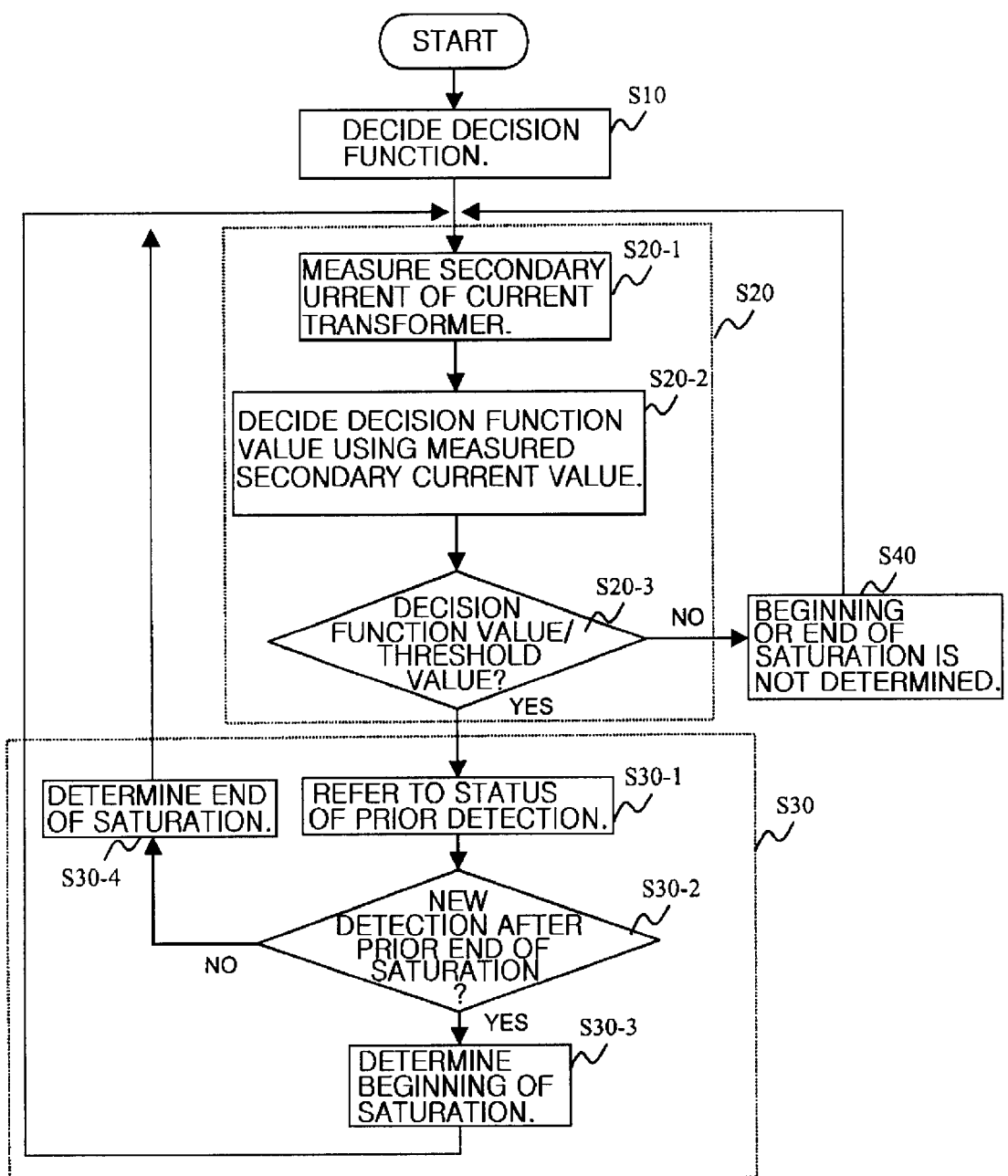
FIG. 3 is a flowchart illustrating a method for determining saturation of a current transformer, according to one embodiment of the present invention.

FIG. 3 is a flowchart illustrating a method for determining saturation of a current transformer according to one embodiment of the present invention.

As shown in the embodiment of FIG. 3, the method for determining the saturation of the current transformer repeats the same procedure at a discrete calculation point of time which is represented by an index n, and increases according to a predetermined time interval.

The procedure includes a step of deciding a decision function (S10) utilizing the secondary current value of the current transformer.

The procedure also includes a step of determination (S20), which comprises the steps of: measuring the secondary current according to the predetermined time interval (S20-1) in order to obtain the secondary current value; deciding the decision function value (S20-2) using the obtained secondary current value at each point of time; and determining whether the decision function value is greater than a predetermined threshold value (S20-3) at each point of time.

The procedure also includes a step of detection (S30), if the decision function value is determined to be greater than a predetermined threshold value at any point of time, referring to the status of the current transformer prior to the point of time whether an end of saturation was detected prior to the point of time (S30-1). Determining whether the detection is a new detection after the prior end of saturation (S30-2). Determining a beginning of saturation if the detection is after the end of saturation (S30-3) and determining an end of saturation if the detection is after the prior beginning of saturation (S30-4).

One of the critical characteristics of the invention is to employ a decision function, which is related to the difference of the secondary current with time. The second-order difference functions of a secondary current can be used. One example of such a function is del2[n] =del1[n] –del1 [n−1]. Here, del1[n]=$i_2$[n]–$i_2$[n−1] and $i_2$[n] is a discretized secondary current value; and n is an index of the discretized value. Alternatively, a function proportional to del2[n] or a wide range of mathematical modifications from del2[n] can be used, since mathematical modifications are just a matter of design change. The following equation is del2[n] expressed by $1_2$[n] function.

$$del2[n]=i_2[n]-2i_2[n-1]+i_2[n-2]$$ [Equation 1]

To use the above second-order difference as a decision function, discretized secondary current values are required. To effectively detect a peak greater than a threshold value, it is possible to differentiate the weight of each term in the equation by adjusting the coefficient of each term. For example, as a decision function, it is possible to use a second-order difference, which is adjusted through experimentation to maximize the ability to detect a peak.

$$del2[n]=a \cdot i_2[n]-i_2[n-1]+C \cdot i_2[n-2]$$ [Equation]

(For example, a=0.9, b=2, c=0.89)

The above change can be easily made by a person skilled in the art and is not beyond the technical concept of the present invention.

Also, considering that the actual waveform of current contains a lot of distortion, as a decision function, an energy function of a difference function to a predetermined section can be used to improve the ability to detect a peak, which is greater than a threshold value. Such an energy function is expressed by the following equation.

$$E(n) = \frac{1}{N} \sum_{k=n+N+1}^{n} del2^2[n]$$ [Equation 3]

A rigorous derivation for presentation of the modified equations is omitted.

As a decision function, it is possible to use a higher order difference of the secondary current, such as a third or a fourth order difference. Like the above second-order difference, it is possible to use an adjusted difference function of the third or fourth order difference. It is also possible to use mathematically modified functions (i.e., multiplying an invariable) of the above functions, because it is of the second-order difference and obvious to one skilled in the art.

Figure 4:
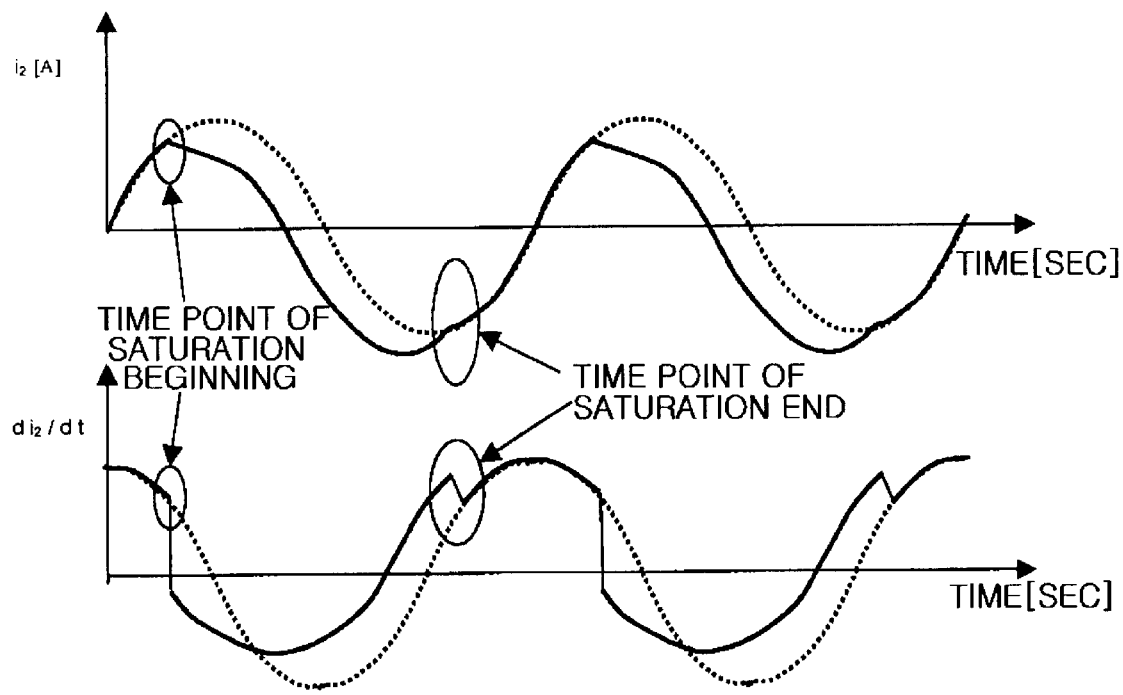
FIG. 4 is a graph illustrating the change of a general secondary current when the current transformer is saturated, and the first-order derivative of the secondary current.

FIG. 4 shows the change of a general secondary current when the current transformer is saturated, and the first-order derivative of the secondary current.

As shown in FIG. 4, when the current transformer is saturated, the change to the waveform of the secondary current depends on the inner change of the iron–core. A first-order derivative of the secondary current shows discontinuities. A second-order derivative of the secondary current shows peaks at the discontinuities of the first-order derivative. Thus, distinction between the beginning/end of saturation and other sections is available at a second or higher order derivative. In many cases, the distinction becomes more apparent in a secondary or higher differential, which makes it possible to detect the beginning/end point of saturation. If a computer implements the detection of saturation from beginning to end, data can be rapidly processed. Therefore, it is possible to correctly determine whether the change of the secondary current is due to faults or saturation. To conduct the calculation with a computer, the first or higher order differentiation should be conducted with digital data. It is obvious to one skilled in the art that many well known numerical differentiation methods and their mathematical modifications can be applied.

FIGS. 5A to 5E show the results of application for determining the saturation of the current transformer, where the remanent magnetizing flux is +80%.

Figure 5A:
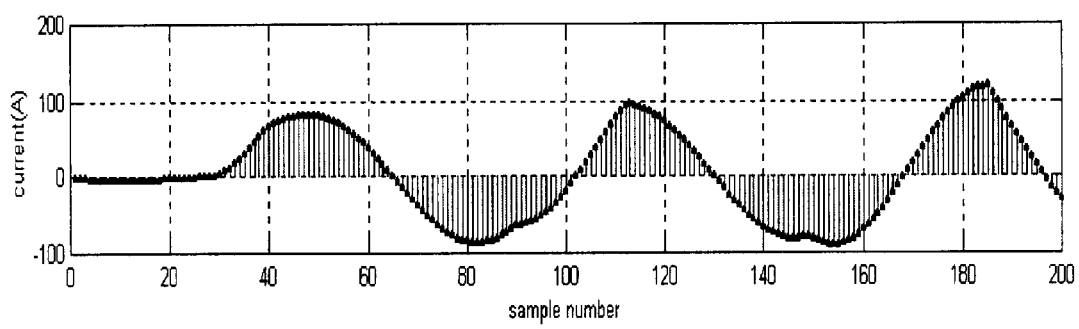
Figure 5B:
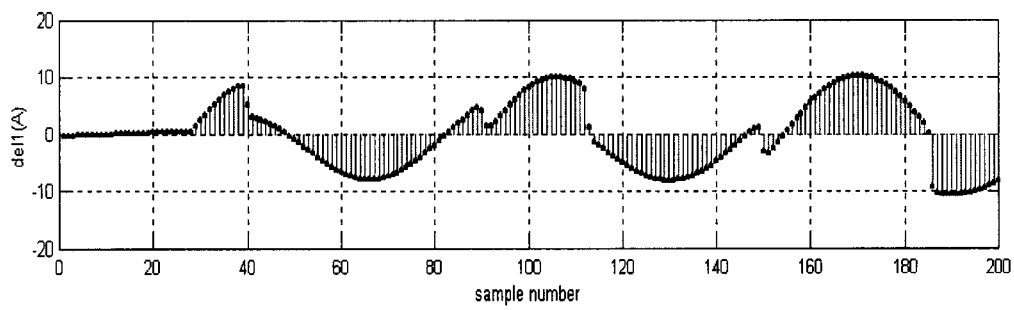

As shown in FIG. 5A, a secondary current of the current transformer deviates from a sine wave as the current transformer is saturated. The first derivative ($di_2/dt$) or difference (del/[n]=$i_2$[n]–$i_2$[n−1]) of the secondary current, which is discretized, exhibits discontinuities, as shown in the waveform of FIG. 5B. The discontinuities of the waveform indicate that significant changes to the secondary current appear at the points of time due to the beginning or end of current transformer saturation.

Figure 5C:
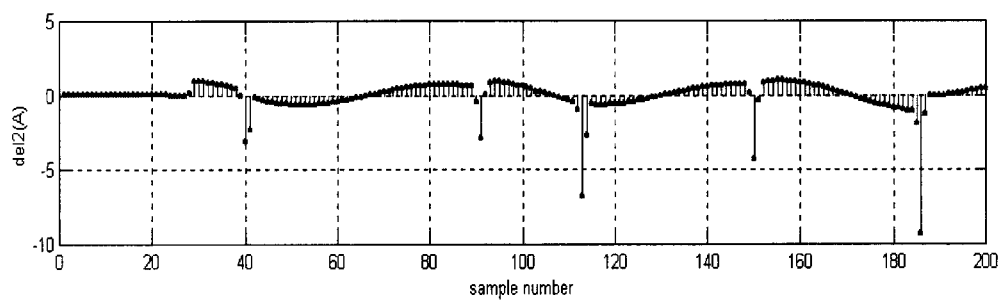

The second-order difference value of the secondary current was shown in FIG. 5C. In FIG. 5C, pulses appear at the points of time where the discontinuities are located. These points are apparently distinguished from the other points on the graph. If a predetermined threshold value is set to distinguish the beginning or end point of saturation from other points based on a decision function value of a second-order derivative or a difference of the secondary current, the beginning or end point of saturation can be easily detected by comparing the decision function value with a predetermined threshold value.

The method for determining saturation by comparing a second-order derivative or a difference value with a predetermined threshold value may incorrectly operate the determining algorithm. In other words; if there is not a big difference in the second-order difference value between the beginning/end point of saturation and the other points, the beginning/end of saturation is possibly determined at the beginning/end point of non-saturation. This may significantly deteriorate the operation stability of a relaying system.

Figure 5D:
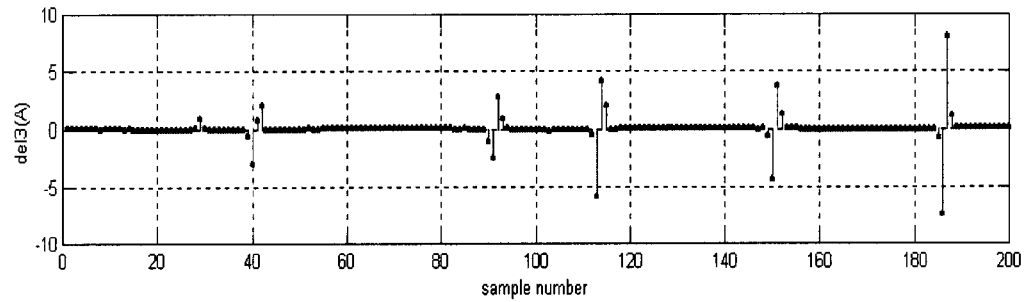
Figure 5E:
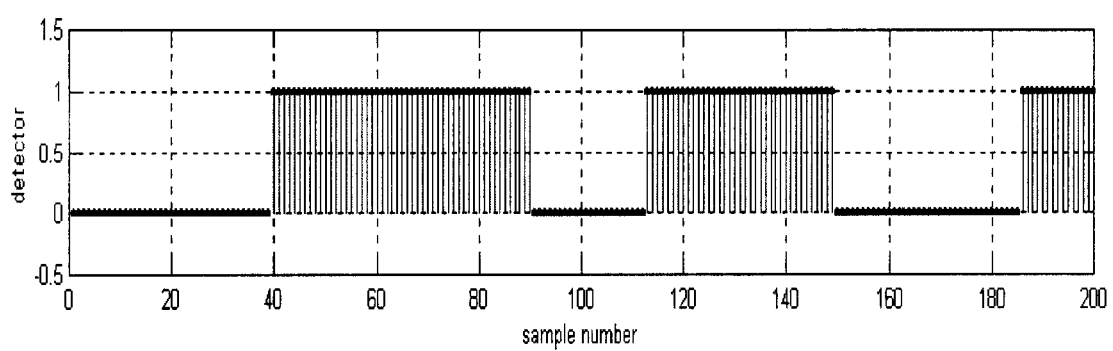

To overcome the defects, a third-order derivative or a third-order difference (del3[n]=del2[n]−del2[n−1]) value can be used as a decision function, as shown in FIG. 5D. In this case, the beginning and end points of saturation clearly indicated as shown in FIG. 5D. Use of the third-order difference further distinguishes the peak points from the other points. As the order of differentiation or difference is higher, the distinction between the peak points and the other points is further clarified, resulting in a broad range of threshold values. This produces the effect of accurate saturation determination. Therefore, as a decision function, use of a third or higher order difference constitutes one of the critical characteristics of the present invention.

Based on the same ground of the third-order difference, a fourth order difference (del4[n]=del3[n]−del[n−1] can naturally be used to further improve the peak detection performance.

The beginning/end point of saturation can be correctly determined by the second or higher order derivative or difference, or their mathematically modified functions. FIGS. 5B to 5D show examples of a first to third-order differences. However, it is obvious that the beginning/end of saturation can be determined by using a decision function of a higher order derivative or difference, or their mathematically modified functions.

According to the preferred embodiments of the present invention, saturation beginning/end point can be determined regardless of the existence of a remanent magnetizing flux. FIGS. 5A to 5E show examples of an embodiment of the present invention, wherein the remanent magnetizing flux is +80%. +80% of remanent magnetizing flux means that +80% of the magnetizing flux exists at the beginning of the detection procedure with respect to the amount of flux of which saturation begins.

There is a need to determine whether the detected saturation is beginning or ending in a current transformer. Saturation beginning is determined if a new point where the decision function exceeding a threshold value is detected after the prior saturation end. Conversely, saturation ending is determined after the prior saturation beginning. In other words, saturation ending and saturation beginning can be distinguished from each other by the following: a first detection after the algorithm operation beginning is determined as saturation beginning; the next detection is determined as saturation ending and the next detection is determined as saturation beginning. A modification is available, which counts the number of detections where a decision function exceeds a threshold value from the beginning of the algorithm operation and determining that odd numbered detections as the beginning of saturation and even numbered detections as the ending of saturation end.

The method for detecting saturation of a current transformer of the present invention can be widely modified and applied within the technical concept of the present invention. The present invention is not limited by its preferred embodiments. It is obvious that saturation detection of a current transformer is available with a decision function having a secondary or higher order difference, such as a decision function having a fourth or a fifth order difference. Therefore, such a decision function is also within the technical concept of the present invention.

However, when a numerical differentiation is used as a decision function, substantial consideration is necessary with respect to the decision step (S20) in FIG. 3. Due to the characteristic of the numerical differentiation, which is based on discretized data, an error occurs in determining the exact point of time when saturation begins and ends, which is equivalent to the interval time (DT) (sampling period) of each data. When a difference or a numerical differentiation of higher order (second, third, fourth etc.) is used as a decision function, the range of error becomes broader. To reduce the error, the interval between the discretized data should be narrowed, so that the sampling rate is increased. As shown in FIG. 5C, when a second-order difference is used, the graph of the discretized decision function has broadened peaks, which extend over points of time in series around the exact point of the beginning and ending of saturation. When a third-order difference is used, general peaks in series extend over four points of time. When the peaks are broadened and extend over many points of time as described above, the values of decision function exceed a threshold value at all points of time within the broadened peak. The first point of time may possibly be determined as the beginning of saturation and the next point of time in series may possibly be determined as the ending of saturation. To prevent such a malfunction, it is possible to determine the first point of time where the decision function is greater than a threshold value as the beginning or ending of saturation, and neglect the next point of time in series, rather than determining that point as the beginning or ending of saturation. Further, it is also possible to neglect the first point of time where the decision function is greater than a threshold value and, determine the second point of time as the beginning/ending of saturation.

To one skilled in the art, a mathematical modification to a derivative or difference disclosed in the embodiments is a minor modification of the present invention, and therefore does not exceed the technical concept of the present invention. For example, as disclosed in the embodiments, the decision function del3[n]=del2[n]−del2[n−1] can be used. This can also be modified by comparing del3[n]−A to 0 or comparing del3[n]/a to 1 instead of comparing the decision function del3[n] to a threshold value A. A more complicated modification is nothing more than a minor change of the present invention, as long as it is merely a mathematically modification.

The objective of the embodiments and drawings is to clearly explain the present invention and does not limit the technical concept of the invention. The present invention described above can be replaced, modified and changed by one skilled in the art, as long as such changes do not exceed the technical scope of the invention. Therefore, the invention is not limited by the embodiments and drawings; and the claims should be included in consideration of the invention.

In the prior art, it was necessary to calculate a remanent magnetizing flux in order to detect saturation of a current transformer. However, according to the present method for detecting saturation of a current transformer, saturation detection is based on the difference of a secondary current value, regardless of remanent magnetizing flux. In the areas, including a protective relaying system, to which the present invention can be applied, the present invention prevents a malfunction of the system caused by saturation of a current transformer, which results in a correct protection of a power system. A third or higher order difference, which is used as a decision function, clearly distinguishes the beginning and end points of saturation from other points, and thus provides a saturation decision securing a stable operation.

What is claimed is:

1. A method for determining saturation of a current transformer comprising the steps of:

deciding a decision function which utilizes a secondary current value of the current transformer, wherein the decision function is preferably one of a second-order difference, an adjusted second-order difference, an energy function of the second-order difference and an energy function of the adjusted second-order difference;

deciding the decision function value at each point of time by measuring the secondary current value at predetermined time intervals;

determining whether the decision function value is greater than a threshold value at each point of time; and when the decision function value is determined to be greater than the predetermined threshold value, determining the beginning or end of the saturation, wherein the saturation of the current transformer is determined to end if the saturation of the current transformer begins before the point that the decision function value is greater than the predetermined threshold value, and the saturation of the current transformer is determined to begin, if the current transformer saturation ends or does not begin before the point where the decision function value is greater than the predetermined threshold value.

2. The method according to claim 1, wherein the determining step includes a preventative malfunction step of determining one of the points of time as an effective detection point, and neglecting the other points of time, wherein the decision function values are detected as being greater than a predetermined threshold value at a plurality of points of time in series.

3. A method for determining saturation of a current transformer comprising the steps of:

deciding a decision function which utilizes a secondary current value of the current transformer, wherein the decision function is preferably one of a third-order difference, an adjusted third-order difference, an energy function of the third-order difference and an energy function of the adjusted third-order difference;

deciding the decision function value at each point of time by measuring the secondary current value at predetermined time intervals;

deciding whether the decision function value is greater than a threshold value at each point of time; and when the decision function value is determined to be greater than the predetermined threshold value, determining the beginning or end of the saturation, wherein the saturation of the current transformer is determined to end if the saturation of the current transformer begins before the point that the decision function value is greater than the predetermined threshold value, and the saturation of the current transformer is determined to begin, if the current transformer saturation ends or does not begin before the point where the decision function value is greater than the predetermined threshold value.

4. The method according to claim 3, wherein the determining step includes a preventative malfunction step of determining one of the points of time as an effective detection point, and neglecting the other points of time, wherein the decision function values are detected as being greater than a predetermined threshold value at a plurality of points of time in series.

5. A method for determining saturation of a current transformer comprising the steps of:

deciding a decision function which utilizes a secondary current value of the current transformer, wherein the decision function is preferably one of a fourth-order difference, an adjusted fourth-order difference, an energy function of the fourth-order difference and an energy function of the adjusted fourth-order difference;

deciding the decision function value at each point of time by measuring the secondary current value at predetermined time intervals;

determining whether the decision function value is greater than a threshold value at each point of time; and when the decision function value is determined to be greater than the predetermined threshold value, determining the beginning or end of the saturation, wherein the saturation of the current transformer is determined to end if the saturation of the current transformer begins before the point that the decision function value is greater than the predetermined threshold value, and the saturation of the current transformer is determined to begin, if the current transformer saturation ends or does not begin before the point where the decision function value is greater than the predetermined threshold value.

6. The method according to claim 5, wherein the determining step includes a preventative malfunction step of determining one of the points of time as an effective detection point, and neglecting the other points of time, wherein the decision function values are detected as being greater than a predetermined threshold value at a plurality of points of time in series.

* * * * *